US012704898B2

(12) United States Patent
Jeong

(10) Patent No.: US 12,704,898 B2
(45) Date of Patent: Aug. 11, 2026

(54) DEVICE AND METHOD FOR CONTROLLING NEARBY APPARATUS IN CONSIDERATION OF USER INTENT

(71) Applicant: Samsung Electronics Co., Ltd., Suwon-si (KR)

(72) Inventor: Moon Yong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/050,548

(22) Filed: Feb. 11, 2025

(65) Prior Publication Data

US 2025/0181146 A1 Jun. 5, 2025

Related U.S. Application Data

(63) Continuation of application No. PCT/KR2023/010047, filed on Jul. 13, 2023.

(30) Foreign Application Priority Data

Aug. 29, 2022 (KR) ........................ 10-2022-0108613
Sep. 15, 2022 (KR) ........................ 10-2022-0116328

(51) Int. Cl.
*G06F 3/01* (2006.01)
*G16Y 40/30* (2020.01)

(52) U.S. Cl.
CPC .............. *G06F 3/011* (2013.01); *G16Y 40/30* (2020.01)

(58) Field of Classification Search
CPC ......... G01S 13/06; G01S 17/88; G02B 27/01; G06F 3/01; G06F 3/011; G06F 3/012; G06F 3/013; G06F 3/017; G16Y 40/30; H04W 4/70
See application file for complete search history.

(56) References Cited

U.S. PATENT DOCUMENTS 6,348,956 B1 * 2/2002 Tanigawa ......... H04N 21/42204 348/569
10,048,782 B2 * 8/2018 Park ....................... H04N 23/61
10,921,896 B2 2/2021 Lopez et al.
11,221,731 B2 * 1/2022 Britt ...................... G06F 3/0482
11,620,824 B2 4/2023 Choi et al.
(Continued)

FOREIGN PATENT DOCUMENTS

KR 10-2011-0117492 A 10/2011
KR 10-2018-0044550 A 5/2018
(Continued)

OTHER PUBLICATIONS

International Search Report dated Oct. 11, 2023, issued in International Application No. PCT/KR2023/010047.

*Primary Examiner* — Mihir K Rayan
(74) *Attorney, Agent, or Firm* — Jefferson IP Law, LLP

(57) ABSTRACT

A device and a method of controlling a nearby apparatus by a control device are provided. The method includes connecting, by the control device, communication with a control target apparatus, receiving, by the control device, input information, and when an execution command corresponding to the input information exists in an operation database, transmitting, by the control device, the execution command corresponding to the input information to the control target apparatus.

17 Claims, 10 Drawing Sheets

(56) References Cited

U.S. PATENT DOCUMENTS

| | | | | |
|---|---|---|---|---|
| 2004/0208588 | A1* | 10/2004 | Colmenarez | G08C 19/28 398/115 |
| 2009/0239587 | A1* | 9/2009 | Negron | G06F 3/017 455/566 |
| 2016/0274762 | A1* | 9/2016 | Lopez | G06T 19/006 |
| 2018/0012412 | A1* | 1/2018 | Scavezze | G06F 18/24 |
| 2021/0042015 | A1* | 2/2021 | Ratcliff | G02B 27/0093 |

FOREIGN PATENT DOCUMENTS

| | | | | | |
|---|---|---|---|---|---|
| KR | 10-1878144 | B1 | | 7/2018 | |
| KR | 10-2073413 | B1 | | 2/2020 | |
| KR | 10-2225411 | B1 | | 3/2021 | |
| KR | 10-2284464 | B1 | | 8/2021 | |
| KR | 10-2321359 | B1 | | 11/2021 | |
| KR | 10-2022-0009244 | A | | 1/2022 | |
| KR | 20220009244 | | * | 1/2022 | H04L 67/131 |
| KR | 10-2022-0017344 | A | | 2/2022 | |
| WO | 2018/198318 | A1 | | 11/2018 | |

* cited by examiner

DEVICE AND METHOD FOR CONTROLLING NEARBY APPARATUS IN CONSIDERATION OF USER INTENT

CROSS-REFERENCE TO RELATED APPLICATION(S)

This application is a continuation application, claiming priority under § 365(c), of an International application No. PCT/KR2023/010047, filed on Jul. 13, 2023, which is based on and claims the benefit of a Korean patent application number 10-2022-0108613, filed on Aug. 29, 2022, in the Korean Intellectual Property Office, and of a Korean patent application number 10-2022-0116328, filed on Sep. 15, 2022, in the Korean Intellectual Property Office, the disclosure of each of which is incorporated by reference herein in its entirety.

BACKGROUND

1. Field

The disclosure relates to technology for controlling a nearby apparatus by a control device.

2. Description of Related Art

Recently, many information technology (IT) companies have been releasing augmented reality (AR) and/or mixed reality (MR) and/or extended reality (XR) glasses or head-mounted display (HMD) devices (hereinafter, referred to as an HMD), so the technology and market are growing. At the same time, the advancement of mobile communication technology on the mobile side is leading the ecosystem that allows one user to effectively use multiple devices. It will be possible for these technological advances to provide an upgraded multi-device experience along with the advances (hands-off, AR interaction) an HMD will bring.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a control device (e.g., a head-mounted display (HMD) device) for verifying user intent and controlling a nearby apparatus according to the user intent.

Additional aspects will be set forth in part in the description which follows and, in part, will be apparent from the description, or may be learned by practice of the presented embodiments.

In accordance with an aspect of the disclosure, a method of controlling a nearby apparatus by a control device is provided. The method includes connecting, by the control device, communication with a control target apparatus, receiving, by the control device, input information, and when an execution command corresponding to the input information exists in an operation database, transmitting, by the control device, the execution command corresponding to the input information to the control target apparatus.

In accordance with another aspect of the disclosure, a control device for controlling a nearby apparatus is provided. The control device includes a communicator configured to connect communication with a control target apparatus, an inputter configured to receive input information, memory storing one or more computer programs, and when an execution command corresponding to the input information exists in an operation database, wherein the one or more computer programs include computer-executable instructions that, when executed by one or more processors individually or collectively, cause the control device to control the execution command corresponding to the input information to be transmitted to the control target apparatus.

In accordance with another aspect of the disclosure, one or more non-transitory computer-readable storage media storing one or more programs including computer executable instructions that, when executed by one or more processors of a control device individually or collectively, cause the control device to perform operations are provided. The operations include connect, by the control device, communication with a control target apparatus, receive, by the control device, input information, and when an execution command corresponding to the input information exists in an operation database, transmit, by the control device, the execution command corresponding to the input information to the control target apparatus.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
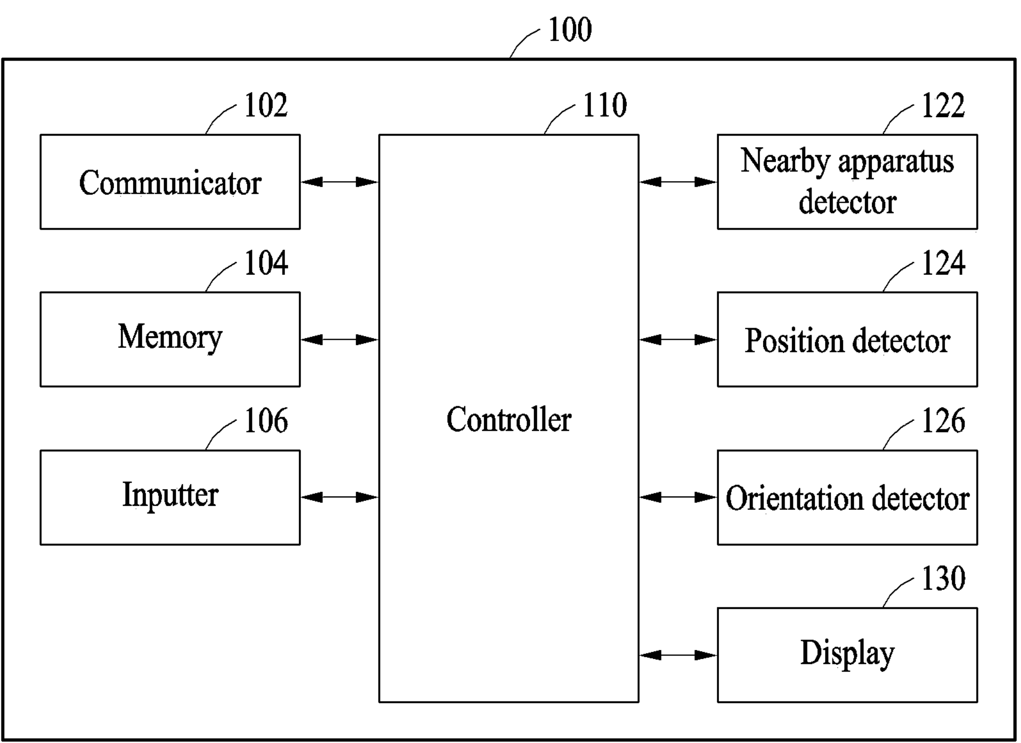
FIG. 1 is a diagram illustrating a schematic configuration of a control device and a control target apparatus, according to an embodiment of the disclosure.
Figure 1:
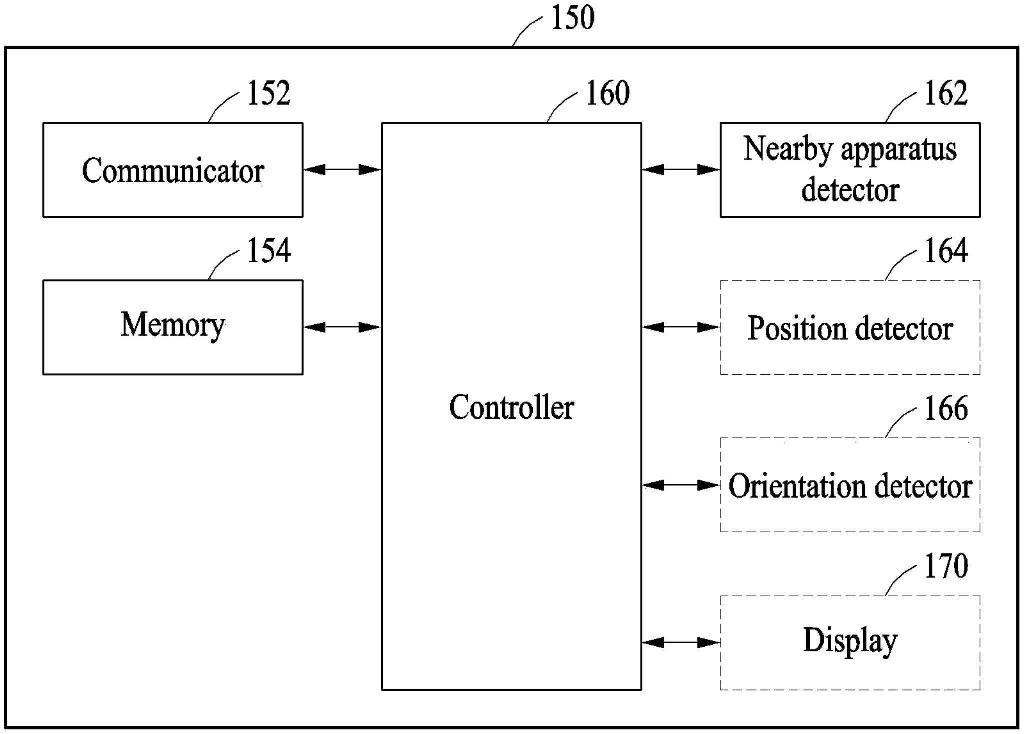

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless otherwise defined, all terms including technical and scientific terms used herein have the same meaning as commonly understood by one of ordinary skill in the art to which the embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like components and a repeated description related thereto will be omitted. In the description of embodiments of the disclosure, detailed description of well-known related structures or functions will be omitted when it is deemed that such description will cause ambiguous interpretation of the disclosure.

In addition, terms, such as first, second, A, B, (a), (b), and the like may be used to describe components of the embodiments. These terms are used only for the purpose of discriminating one component from another component, and the nature, the sequences, or the orders of the components are not limited by the terms. It should be noted that if one component is described as being "connected," "coupled" or "joined" to another component, the former may be directly "connected," "coupled," and "joined" to the latter or "connected", "coupled", and "joined" to the latter via another component.

The same name may be used to describe an element included in the embodiments described above and an element having a common function. Unless otherwise mentioned, the descriptions on the embodiments may be applicable to the following embodiments and thus, duplicated descriptions will be omitted for conciseness.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Hereinafter, according to an embodiment of the disclosure, a device and a method for controlling a nearby apparatus by considering user intent are described in detail with reference to FIGS. 1 to 10.

FIG. 1 is a diagram illustrating a schematic configuration of a control device and a control target apparatus according to an embodiment of the disclosure.

Referring to FIG. 1, a control device 100 may include a communicator 102, memory 104, an inputter 106, a controller 110, a nearby apparatus detector 122, a position detector 124, an orientation detector 126, and a display 130.

The communicator 102 is a communication interface device, which includes a receiver and a transmitter, and may connect communication with a control target apparatus 150 to transmit and receive data.

The memory 104 may store an operation database. The operation database may store an execution command corresponding to input information for each interaction mode. The memory 104 may store an operating system, an application program, and storage data to control the overall operation of the control device 100.

The inputter 106 may receive the input information. The input information may include pupil-tracking input information, hand-tracking input information, head-tracking input information, and voice input information.

The inputter 106 may include a separate sensor to obtain each of the pupil-tracking input information, the hand-tracking input information, the head-tracking input information, and the voice input information.

The nearby apparatus detector 122 may search for a nearby apparatus. The nearby apparatus detector 122 may perform Bluetooth or wireless-fidelity (Wi-Fi) communication and be included in the communicator 102.

The position detector 124 may estimate the distance and the direction with respect to the nearby apparatus. The position detector 124 may estimate the distance and the direction with respect to the nearby apparatus using at least one of a short-range detection sensor, an image sensor, a light detection and ranging (Lidar) sensor, and ultra-wideband (UWB) communication.

The orientation detector 126 may verify the orientation direction, which is the direction in which the control device 100 faces. The orientation detector 126 may be configured as, for example, a gyro sensor.

The display 130 may display the result of executing the execution command received from the control target apparatus 150. The display 130 may display state information (or an indicator), limited numbers and characters, moving pictures, and still pictures, which are generated during an operation of the control device 100.

The controller 110 may search for a nearby apparatus through the nearby apparatus detector 122, obtain information of an unconnected nearby apparatus, estimate the distance and the direction with respect to the nearby apparatus through the position detector 124, and select the control target apparatus by considering the distance to the nearby apparatus and the direction of the nearby apparatus.

The controller 110 may select the nearby apparatus as the control target apparatus when the distance to the nearby apparatus is in a preset effective distance corresponding to the nearby apparatus and the direction of the nearby apparatus is in a preset angle range of the control device 100. Here, whether the direction of the nearby apparatus is in the preset angle range of the control device 100 may be verified based on the orientation direction of the control device 100, which is verified through the orientation detector 126.

The controller 110 may select an interaction mode corresponding to the control target apparatus and may control the execution command corresponding to the input information to be transmitted to the control target apparatus 150 when the execution command corresponding to the input information exists in the operation database according to the interaction mode.

When selecting the interaction mode, the controller 110 may select one of a mobile mode, an Internet of things (IoT) mode, or a display mode according to the control target apparatus 150.

Here, the mobile mode may be a mode set when the control target apparatus 150 is a mobile device, such as a mobile phone, a smartphone, or a tablet. The display mode may be a mode applied to a fixed display device, such as a television or a computer monitor. The IoT mode may be a mode applied to all devices (e.g., a lamp, a refrigerator, a fan, a humidifier, an electric curtain, or the like) capable of a communication connection that is not applied to the mobile mode and the display mode.

When selecting the interaction mode, the controller 110 may select a mode with a higher priority by assigning priorities in order of a mobile mode, an IoT mode, and a display mode when the control target apparatus 150 is provided in plurality and the plurality of control target apparatuses 150 has different interaction modes.

The controller 110 may control the result of executing the execution command corresponding to the input information to be output through the control target apparatus 150 or the control device 100. When outputting the result of executing the execution command corresponding to the input information in the control device 100, the controller 110 may output the result on the display 130.

Here, the input information may include at least one of the pupil-tracking input information, the hand-tracking input information, the head-tracking input information, the voice input information, an operation status of the control target apparatus, and characteristic information of the control target apparatus. Here, among the pieces of input information, the pupil-tracking input information, the hand-tracking input information, the head-tracking input information, and the voice input information may be obtained through the inputter 106. In addition, among the pieces of input information, the operation status of the control target apparatus 150 and the characteristic information of the control target apparatus 150 may be received from the control target apparatus 150 through the communicator 102. Here, the operation status of the control target apparatus 150 may include at least one of application information being executed by the control target apparatus 150, which is received from the control target apparatus 150, application information executable by the control target apparatus 150, which is received from the control target apparatus 150, and application information executable by the control target apparatus 150 and interoperable with the control device 100, which is received from the control target apparatus 150. Here, the characteristic information of the control target apparatus 150 may include at least one of state information of the control target apparatus 150, which is received from the control target apparatus 150, setting information of the control target apparatus 150, which is received from the control target apparatus 150, and sensing information measured by the control target apparatus 150, which is received from the control target apparatus 150.

The controller 110 may display, among nearby apparatuses, the control target apparatus 150 on the display 130 before receiving the input information so that a user may verify which apparatus is selected as the control target apparatus 150.

The controller 110 may verify whether the interaction mode is capable of being changed when the execution command corresponding to the input information does not exist in the operation database according to the interaction mode.

The controller 110 may change the interaction mode when it is possible to change the interaction mode as a result of the verification and may control the execution command corresponding to the input information to be executed by the control target apparatus 150 when the execution command corresponding to the input information exists in the operation database according to the interaction mode.

The controller 110 may control related notification information to be output on the display 130 when the execution command corresponding to the input information does not exist in the operation database according to the interaction mode and it is impossible to change the interaction mode. The related notification information may be a notification that the execution command corresponding to the input information does not exist, a notification that the input information is incorrect, or a notification requesting a re-input.

When the interaction mode is a mobile mode, the controller 110 may receive orientation information of the control target apparatus 150 and may control, using the orientation information of the control target apparatus 150, the control target apparatus 150 only when the orientation direction of the control target apparatus 150 faces the control device 100. For example, the control target apparatus 150 may be controlled only when a user of the control device 100 may see a display of the control target apparatus 150.

The control target apparatus 150 may include a communicator 152, memory 154, a controller 160, and a nearby apparatus detector 162. Here, the control target apparatus 150 may further include at least one of a position detector 164, an orientation detector 166, and a display 170. Here, the position detector 164, the orientation detector 166, and the display 170 are optional components and may not be included in the control target apparatus 150.

The communicator 152 is a communication interface device, which includes a receiver and a transmitter, and may connect communication with the control device 100 to transmit and receive data.

The memory 154 may store an operating system, an application program, and storage data to control the overall operation of the control target apparatus 150.

The nearby apparatus detector 162 may search for a nearby apparatus. The nearby apparatus detector 162 may perform Bluetooth or Wi-Fi communication and be included in the communicator 152.

The position detector 164 may estimate the distance and the direction with respect to the nearby apparatus. The position detector 164 may provide, using UWB communication, the position and the direction of the control target apparatus 150 to the control target apparatus 150 in correspondence with the position detector 124 of the control device 100.

The orientation detector 166 may verify the orientation direction, which is the direction in which the control target apparatus 150 faces. The orientation detector 166 may be configured as, for example, a gyro sensor.

The display 170 may display state information (or an indicator), limited numbers and characters, moving pictures, and still pictures, which are generated during an operation of the control target apparatus 150.

The display 170 may display the result of executing the execution command, which is received from the control device 100, under the control of the controller 160.

The controller 160 may verify whether communication is connected to the control device 100, and when communication is not connected to the control device 100, in operation 314, the control target apparatus 150 may control information of a corresponding device to be transmitted to the control device 100 when a search signal is received from the control device 100.

The controller 160 may control the position direction of the control target apparatus 150 to be provided through the position detector 164 in response to performing position direction estimation through UWB communication by the control device 100.

The controller 160 may control a communication connection between apparatuses to be performed through the communicator 152 according to the request from the control device 100.

When communication is connected to the control device 100 and the execution command is received from the control device 100, the controller 160 may verify whether the received execution command is an executable command and may execute the execution command when the received execution command is executable.

The controller 160 may control the result of executing the execution command to be output on the display 170 or to be transmitted to the control device 100.

When the received execution command is not an executable command, the controller 160 may control an execution impossibility notification, which indicates that the execution command may not be executed by a corresponding device, to be transmitted to the control device 100 through the communicator 152.

Hereinafter, a method according to the disclosure configured as described above is described with reference to the drawings.

Figure 2:
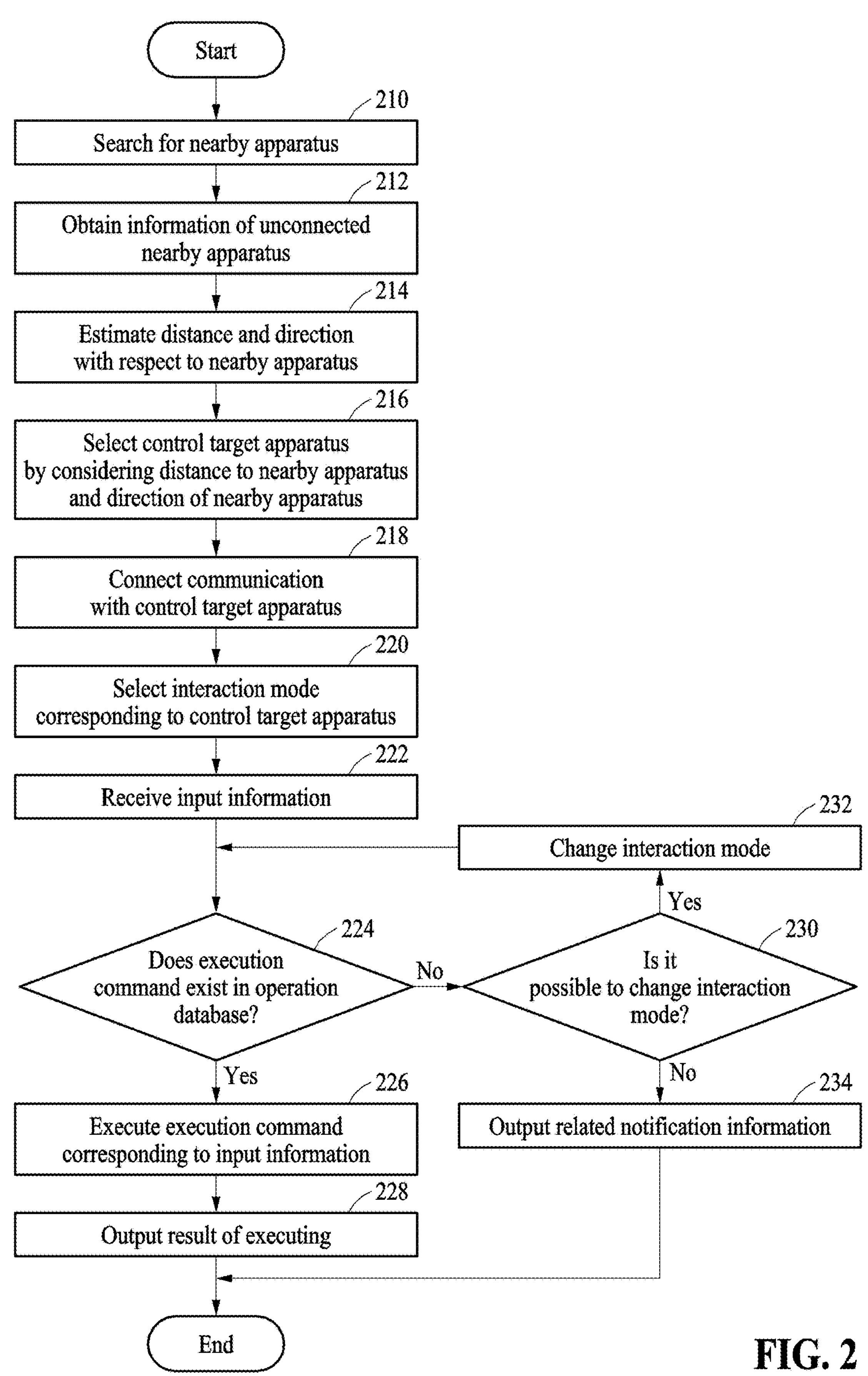
FIG. 2 is a flowchart illustrating a process of controlling a nearby apparatus by a control device, according to an embodiment of the disclosure.

FIG. 2 is a flowchart illustrating a process of controlling a nearby apparatus by a control device, according to an embodiment of the disclosure.

Referring to FIG. 2, in operation 210, the control device 100 may search for a nearby apparatus. In operation 210, the control device 100 may search for the nearby apparatus through a Bluetooth scan or a Wi-Fi scan.

In operation 212, the control device 100 may obtain information of an unconnected nearby apparatus.

In operation 214, the control device 100 may estimate the distance and the direction with respect to the nearby apparatus. In operation 214, the control device 100 may estimate the distance and the direction with respect to the nearby apparatus using at least one of a short-range detection sensor, an image sensor, a Lidar sensor, and UWB communication.

In operation 216, the control device 100 may select the control target apparatus 150 by considering the distance to the nearby apparatus and the direction of the nearby apparatus.

In operation 216, the control device 100 may select the nearby apparatus as the control target apparatus when the distance to the nearby apparatus is in a preset effective distance corresponding to the nearby apparatus and the direction of the nearby apparatus is in a preset angle range of the control device.

Figure 4:
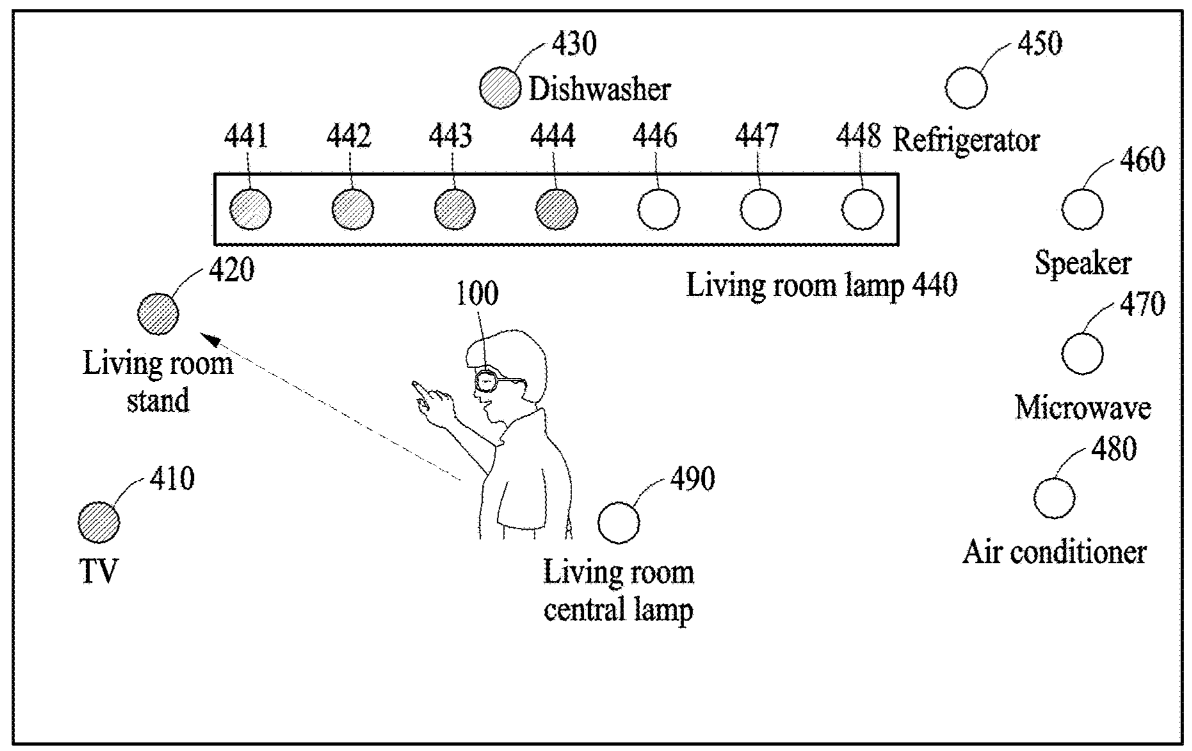
FIG. 4 is a diagram illustrating selecting a control target apparatus from among nearby apparatuses according to a position and orientation direction of a control device, according to an embodiment of the disclosure.

FIG. 4 is a diagram illustrating selecting a control target apparatus from among nearby apparatuses according to a position and orientation direction of a control device according to an embodiment of the disclosure.

Referring to FIG. 4, it may be assumed that nearby apparatuses 410 to 490, such as a television 410, a living room stand 420, a dishwasher 430, living room lamps 441 to 448, a refrigerator 450, a speaker 460, a microwave 470, an air conditioner 480, and a living room central lamp 490, exist.

When a user wearing the control device 100 in the form of a head-mounted display (HMD) device looks at the living room stand 420 and moves toward the living room stand 420 to control the living room stand 420, only the television 410, the living room stand 420, the dishwasher 430, and the living room lamps 441 to 444 may come into the field of view of the user, and when the control device 100 is positioned in a preset effective distance with respect to each of the television 410, the living room stand 420, the dishwasher 430, and the living room lamps 441 to 444, the control device 100 may select, as the control target apparatuses 150, the television 410, the living room stand 420, the dishwasher 430, and the living room lamps 441 to 444.

For example, the control device 100 may select the nearby apparatus as the control target apparatus when the distance to the nearby apparatuses 410 to 490 is in a preset effective distance corresponding to each of the nearby apparatuses 410 to 490 and the direction of the nearby apparatuses 410 to 490 is in a preset angle range (e.g., the field of view of the user) of the control device 100.

It may be seen that the living room central lamp 490 is not selected as the control target apparatus 150 because the living room central lamp 490 is positioned close to the control device 100 but is not included in the field of view of the user of the control device 100.

Referring back to FIG. 1, the control device 100 may connect communication with the control target apparatus 150.

In operation 220, the control device 100 may select an interaction mode corresponding to the control target apparatus 150.

In operation 220, the control device 100 may select the interaction mode corresponding to the control target apparatus 150. The interaction mode may be one of a mobile mode, an IoT mode, or a display mode. Here, the mobile mode may be a mode set when the control target apparatus 150 is a mobile device, such as a mobile phone, a smartphone, or a tablet. The display mode may be a mode applied to a fixed display device, such as a television or a computer monitor. The IoT mode may be a mode applied to all devices (e.g., a lamp, a refrigerator, a fan, a humidifier, an electric curtain, or the like) capable of a communication connection that is not applied to the mobile mode and the display mode.

In operation 220, the control device 100 may select a mode with a higher priority by assigning priorities in order of a mobile mode, an IoT mode, and a display mode when the control target apparatus 150 is provided in plurality and the plurality of control target apparatuses 150 has different interaction modes.

In operation 222, the control device 100 may receive input information. Here, the input information may include at least one of pupil-tracking input information, hand-tracking input information, head-tracking input information, voice input information, an operation status of the control target apparatus 150, and characteristic information of the control target apparatus 150. Here, the operation status of the control target apparatus 150 may include at least one of application information being executed by the control target apparatus 150, which is received from the control target apparatus 150, application information executable by the control target apparatus 150, which is received from the control target apparatus 150, and application information executable by the control target apparatus 150 and interoperable with the control device 100, which is received from the control target apparatus 150. Here, the characteristic information of the control target apparatus 150 may include at least one of state information of the control target apparatus 150, which is received from the control target apparatus 150, setting information of the control target apparatus 150, which is received from the control target apparatus 150, and sensing information measured by the control target apparatus 150, which is received from the control target apparatus 150.

Moreover, before operation 222, the control device 100 may display the control target apparatus 150 so that a user of the control device 100 may easily verify what the control target apparatus 150 is.

Figure 5:
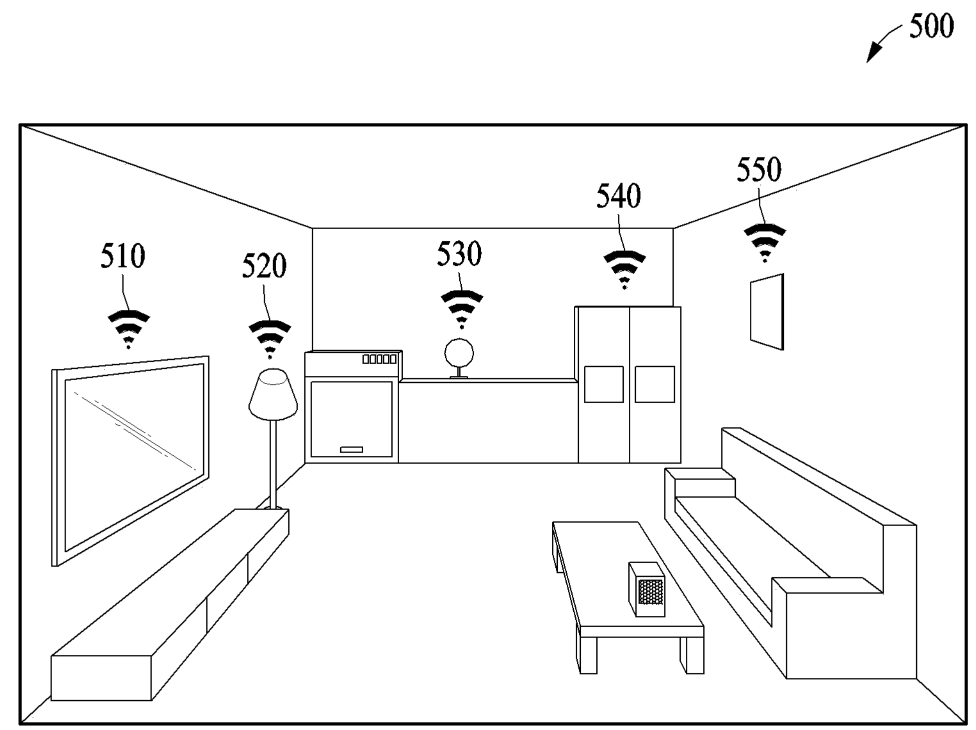
FIG. 5 is a diagram illustrating displaying a control target apparatus on a control device according to an embodiment of the disclosure.

FIG. 5 is a diagram illustrating displaying a control target apparatus on a control device according to an embodiment of the disclosure.

Referring to FIG. 5, the control device 100 may display that a television 510, a stand lamp 520, a speaker 530, a refrigerator 540, and an interphone 550, which are the control target apparatuses 150, are wirelessly connected to an augmented reality (AR) screen 500 to be output so that a user may easily distinguish the control target apparatuses 150.

In the example of FIG. 5, the control target apparatus 150 is represented as an antenna mark but is not limited thereto, and the control target apparatus 150 may be represented in various ways, such as displaying different marks or edges of the control target apparatus 150.

Referring back to FIG. 1, in operation 224, the control device 100 may verify whether an execution command corresponding to the input information exists in an operation database according to the interaction mode.

As a result of the verification of operation 224, in operation 226, the control device 100 may transmit the execution command corresponding to the input information to the control target apparatus 150 when the execution command corresponding to the input information exists in the operation database according to the interaction mode.

In operation 228, the control device 100 may output the result of executing the execution command corresponding to the input information through the control target apparatus 150 or the control device 100.

In operation 228, the control device 100 may output the result of executing when the result of executing the execution command is received from the control target apparatus 150.

As a result of the verification of operation 224, in operation 230, the control device 100 may verify whether the interaction mode is capable of being changed when the execution command corresponding to the input information does not exist in the operation database according to the interaction mode.

As a result of the verification of operation 230, in operation 232, the control device 100 may change the interaction mode when it is possible to change the interaction mode and may return to operation 224.

As a result of the verification of operation 230, in operation 234, the control device 100 may output related notification information when it is impossible to change the interaction mode. The related notification information may be a notification that the execution command corresponding to the input information does not exist, a notification that the input information is incorrect, or a notification requesting a re-input.

Figure 3:
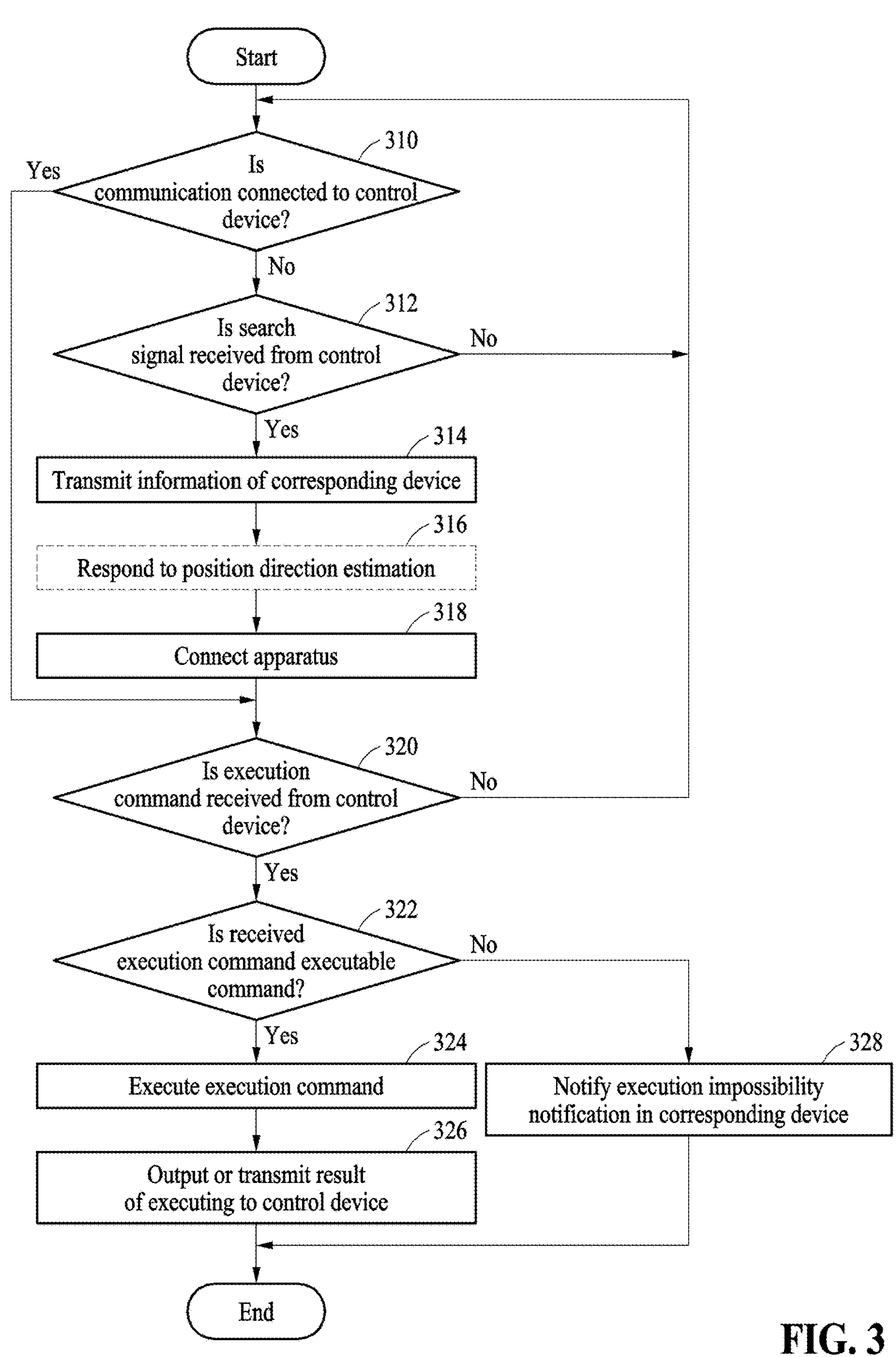
FIG. 3 is a flowchart illustrating a process of controlling a control target apparatus by a control device, according to an embodiment of the disclosure.

FIG. 3 is a flowchart illustrating a process of controlling a control target apparatus by a control device, according to an embodiment of the disclosure.

Referring to FIG. 3, in operation 310, the control target apparatus 150 may verify whether communication is connected to the control device 100.

When communication is not connected to the control device 100 as a result of the verification of operation 310, in operation 312, the control target apparatus 150 may verify whether a search signal is received from the control device 100.

When the search signal is received from the control device 100 as a result of the verification of operation 312, in operation 314, the control target apparatus 150 may transmit information of a corresponding device to the control device 100.

In operation 316, the control target apparatus 150 may provide the position direction of the control target apparatus 150 in response to performing position direction estimation through UWB communication by the control device 100. Operation 316 may be omitted when a configuration for UWB communication does not exist in the control target apparatus 150.

In operation 318, the control target apparatus 150 may perform a communication connection between apparatuses according to the request from the control device 100.

When communication is connected to the control device 100 as a result of the verification of operation 310 or communication is connected to the control device 100 in operation 318, in operation 320, the control target apparatus 150 may verify whether the execution command is received from the control device 100.

When the execution command is received from the control device 100 as a result of the verification of operation 320, in operation 322, the control target apparatus 150 may verify whether the received execution command is an executable command.

When the received execution command is an executable command as a result of the verification of operation 322, in operation 324, the control target apparatus 150 may execute the received execution command.

In operation 326, the control target apparatus 150 may output the result of executing the execution command or transmit the result to the control device 100.

When the received execution command is not an executable command as a result of the verification of operation 322, in operation 328, the control target apparatus 150 may transmit, to the control device 100, an execution impossibility notification indicating that the execution command may not be executed by a corresponding device.

An example of controlling the control target apparatus 150 by the control device 100 is described below with reference to FIGS. 6 to 8.

Figure 6:
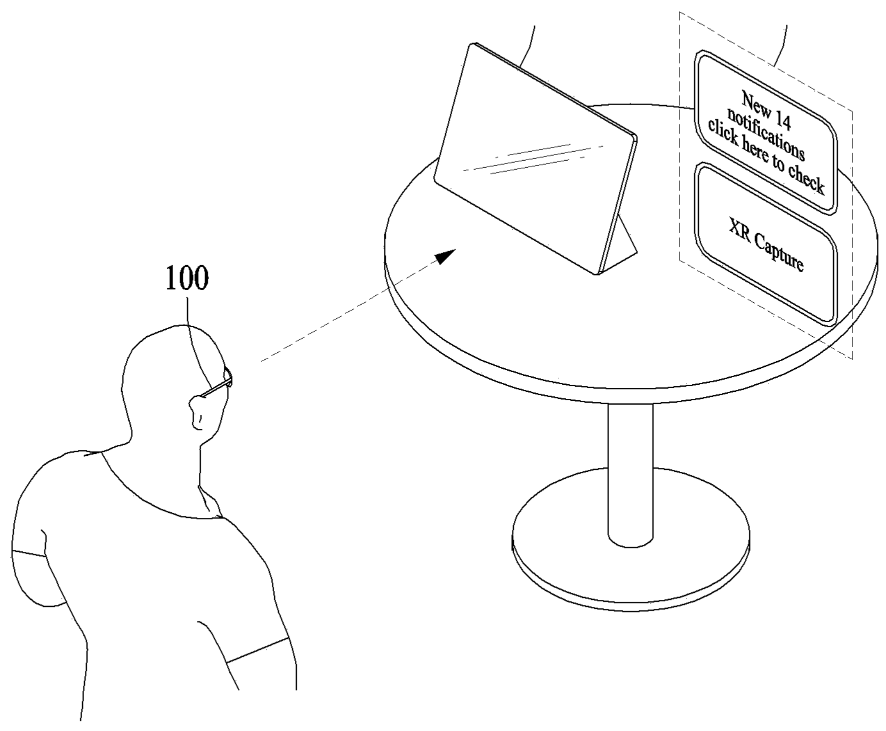
FIG. 6 is a diagram illustrating controlling a control target apparatus by a control device by considering user intent when approaching a control target apparatus according to an embodiment of the disclosure.

FIG. 6 is a diagram illustrating controlling a control target apparatus by a control device by considering user intent when approaching a control target apparatus according to an embodiment of the disclosure.

Referring to FIG. 6, when a user wearing the control device 100 in the form of an HMD approaches a mobile pad 610, which is the control target apparatus 150, the control device 100 may receive notification information of the mobile pad 610 and application information being executed and may output the notification information of the mobile pad 610 and the application information being executed in the form of an AR screen 620 next to the mobile pad 610.

Figure 7:
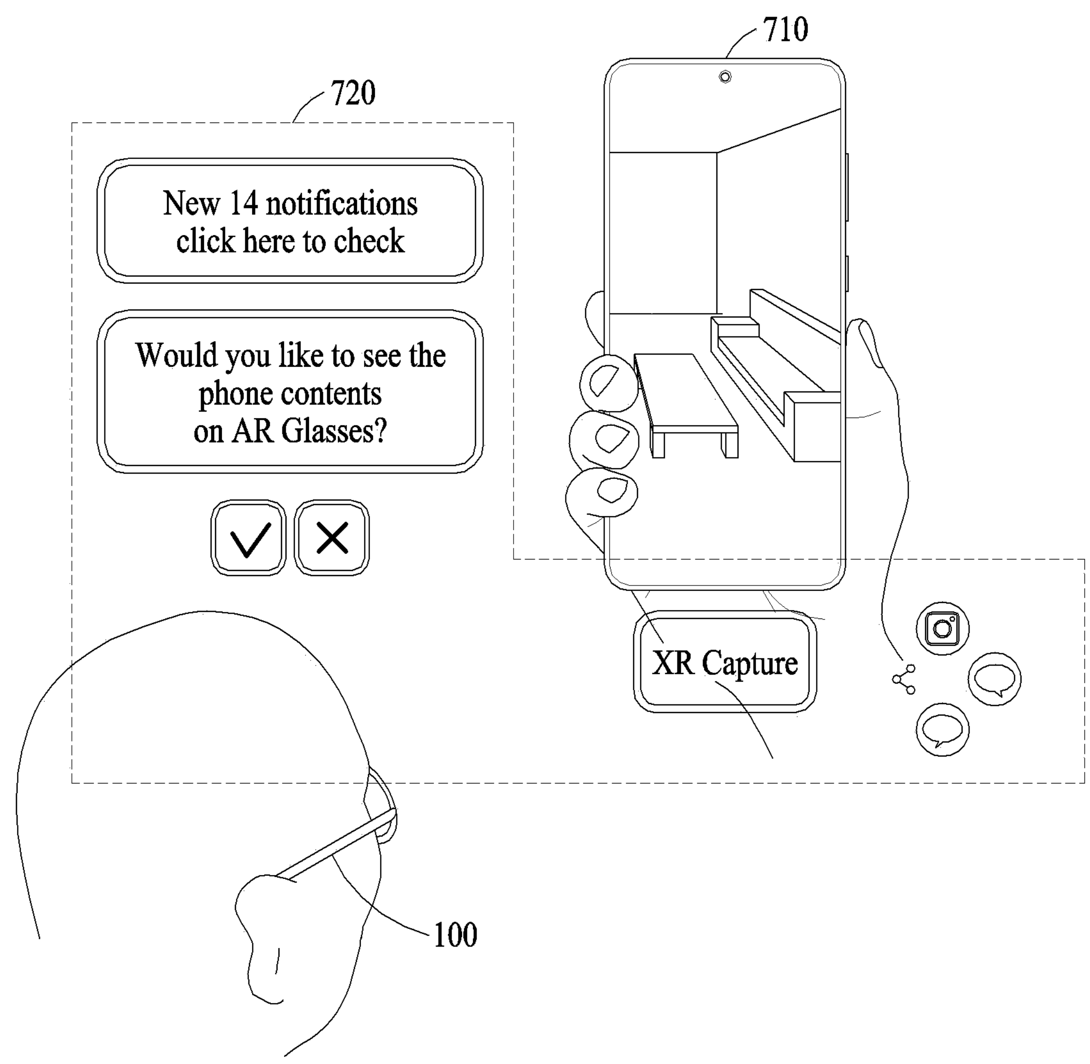
FIG. 7 is a diagram illustrating controlling a control target apparatus by a control device by considering user intent when picking up a control target apparatus according to an embodiment of the disclosure.

FIG. 7 is a diagram illustrating controlling a control target apparatus by a control device by considering user intent when picking up a control target apparatus according to an embodiment of the disclosure.

Referring to FIG. 7, when a user wearing the control device 100 in the form of an HMD picks up and looks at a mobile terminal 710, which is the control target apparatus 150, with their hand, the control device 100 may receive notification information of the mobile terminal 710 and application information being executed or application information frequently used and may output the notification information of the mobile terminal 710 and the application information being executed or the application information frequently used in the form of an AR screen 720 around the mobile terminal 710.

Figure 8:
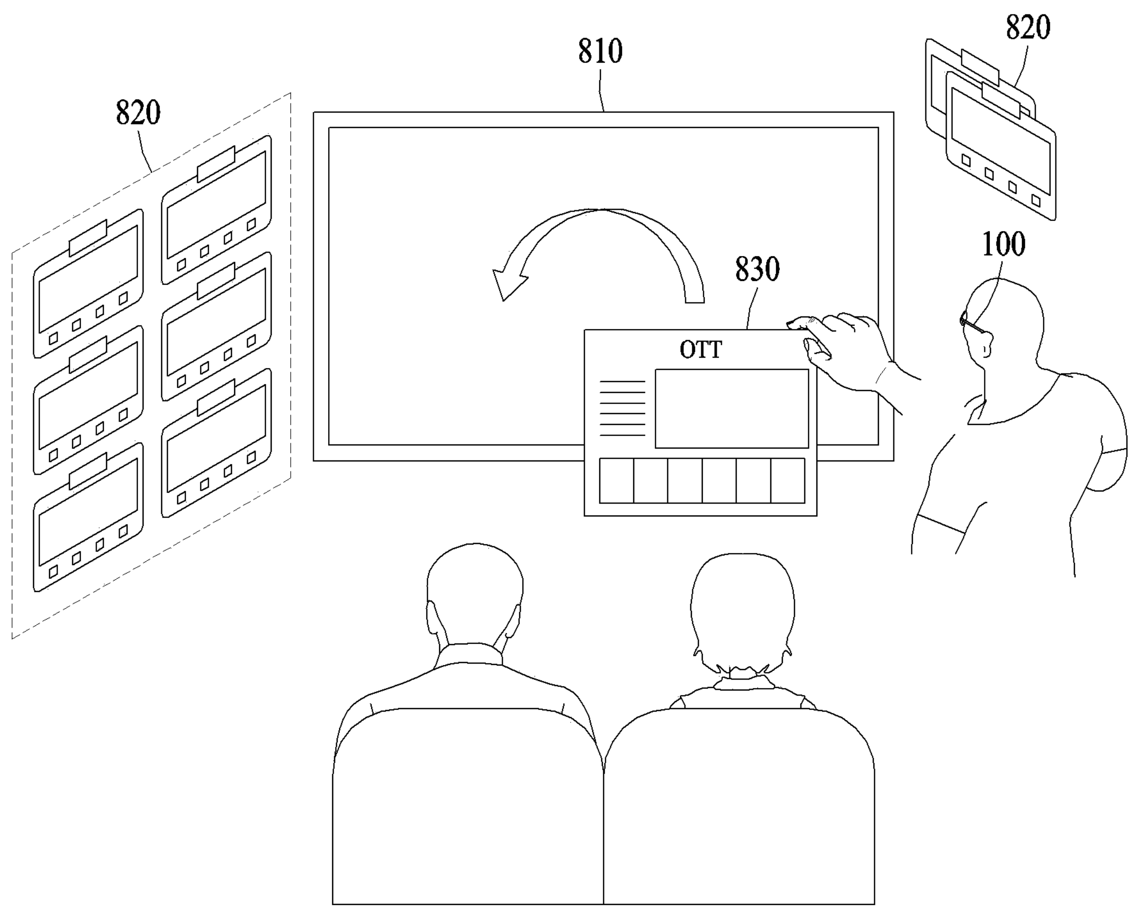
FIG. 8 is a diagram illustrating controlling a control target apparatus by a control device when sharing a screen with a control target apparatus according to an embodiment of the disclosure.

FIG. 8 is a diagram illustrating controlling a control target apparatus by a control device when sharing a screen with a control target apparatus according to an embodiment of the disclosure.

Referring to FIG. 8, a user wearing the control device 100 in the form of an HMD may display images 820 captured by the control device 100, which are output screens of the control device 100, or an over-the-top (OTT) application screen 830 executed by the control device 100 on a television 810, which is the control target apparatus 150.

For example, the user wearing the control device 100 may perform a gesture of picking up the OTT application screen 830 with the hand of the user and dropping the OTT application screen 830 on the television 810, thereby causing the OTT application screen 830 of the control device 100 to be displayed on the television 810.

Figure 9:
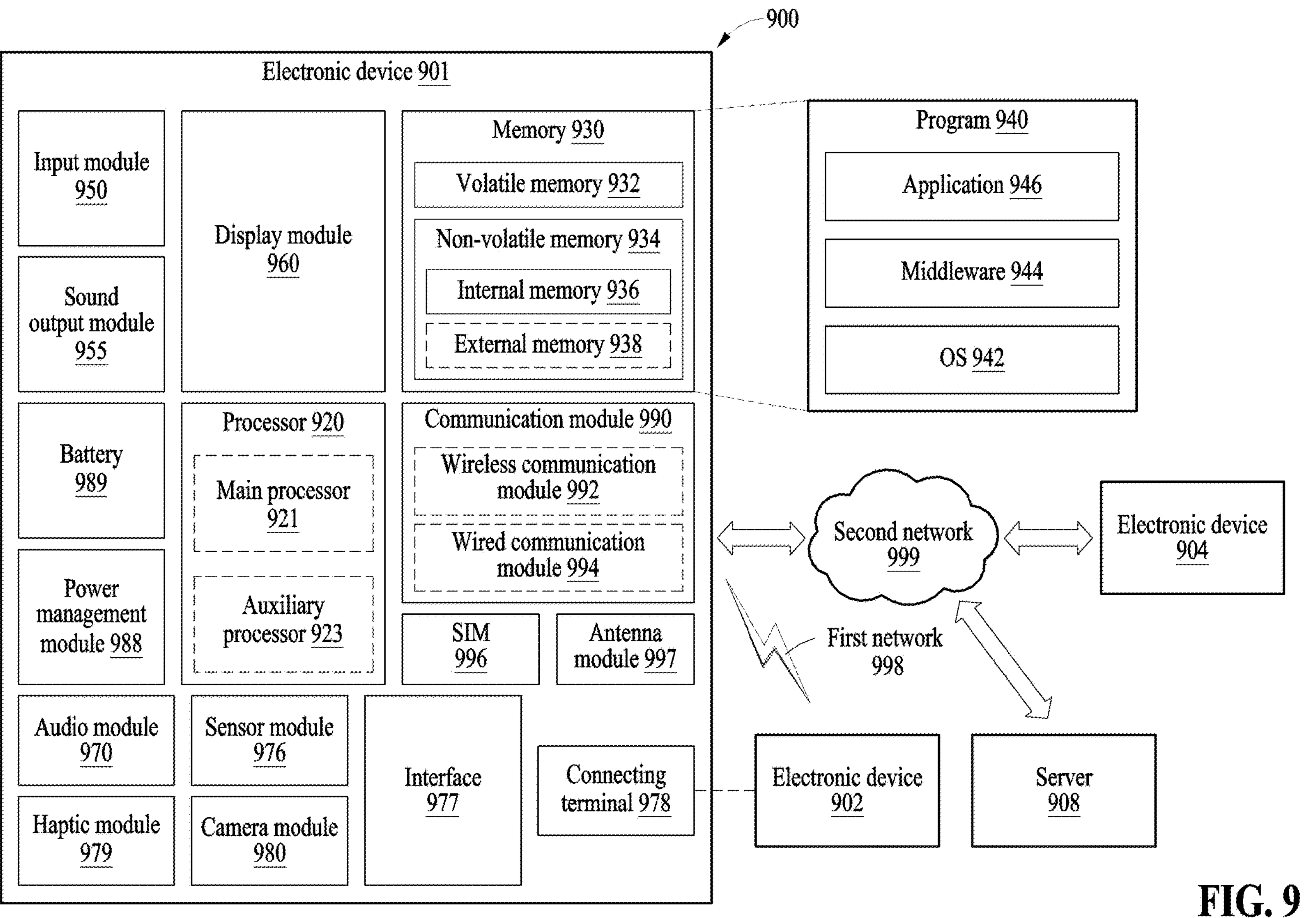
FIG. 9 is a block diagram illustrating an electronic device in a network environment according to an embodiment of the disclosure.

FIG. 9 is a block diagram illustrating an electronic device in a network environment according to an embodiment of the disclosure.

Referring to FIG. 9, the electronic device 901 in the network environment 900 may communicate with an external electronic device 902 via a first network 998 (e.g., a short-range wireless communication network), or communicate with at least one of an external electronic device 904 and a server 908 via a second network 999 (e.g., a long-range wireless communication network). According to an embodiment of the disclosure, the electronic device 901 may communicate with the external electronic device 904 via the server 908. According to an embodiment of the disclosure, the electronic device 901 may include a processor 920, memory 930, an input module 950, a sound output module 955, a display module 960, an audio module 970, and a sensor module 976, an interface 977, a connecting terminal 978, a haptic module 979, a power management module 988, a battery 989, a communication module 990, a subscriber identification module 996, or an antenna module 997. In some embodiments of the disclosure, at least one of the components (e.g., the connecting terminal 978) may be omitted from the electronic device 901, or one or more other components may be added to the electronic device 901. In some embodiments of the disclosure, some of the components (e.g., the sensor module 976, the camera module 980, or the antenna module 997) may be integrated as a single component (e.g., the display module 960).

The control device 100 may also be implemented in the form of the electronic device 901.

The processor 920 may execute, for example, software (e.g., a program 940) to control at least one other component (e.g., a hardware or software component) of the electronic device 901 connected to the processor 920 and may perform various data processing or computations. According to an embodiment of the disclosure, as at least a part of data processing or computations, the processor 920 may store a command or data received from another component (e.g., the sensor module 976 or the communication module 990) in volatile memory 932, process the command or the data stored in the volatile memory 932, and store resulting data in non-volatile memory 934. According to an embodiment of the disclosure, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from or in conjunction with the main processor 921. For example, when the electronic device 901 includes the main processor 921 and the auxiliary processor 923, the auxiliary processor 923 may be adapted to consume less power than the main processor 921 or to be specific to a specified function. The auxiliary processor 923 may be implemented separately from the main processor 921 or as a part of the main processor 921.

The auxiliary processor 923 may control at least some of functions or states related to at least one (e.g., the display module 960, the sensor module 976, or the communication module 990) of the components of the electronic device 901, instead of the main processor 921 while the main processor 921 is in an inactive (e.g., sleep) state or along with the main processor 921 while the main processor 921 is an active state (e.g., executing an application). According to an embodiment of the disclosure, the auxiliary processor 923 (e.g., an ISP or a CP) may be implemented as a portion of another component (e.g., the camera module 980 or the communication module 990) that is functionally related to the auxiliary processor 923 (e.g., an ISP or a CP). According to an embodiment of the disclosure, the auxiliary processor 923 (e.g., an NPU) may include a hardware structure specifically for artificial intelligence model processing. An artificial intelligence model may be generated by machine learning. The machine learning may be performed by, for example, the electronic device 901, in which artificial intelligence is performed, or performed via a separate server (e.g., the server 908). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

Moreover, the processor 920 may perform the operation of the controller 110 of FIG. 1.

The memory 930 may store various pieces of data used by at least one component (e.g., the processor 920 or the sensor module 976) of the electronic device 901. The various pieces of data may include, for example, software (e.g., the program 940) and input data or output data for a command related thereto. The memory 930 may include the volatile memory 932 or the non-volatile memory 934. The memory 930 may perform the operation of the memory 104 of FIG. 1. The non-volatile memory 934 may include internal memory 936 and external memory 938.

The program 940 may be stored as software in the memory 930 and may include, for example, an operating system (OS) 942, middleware 944, or an application 946.

The input module 950 may receive, from outside (e.g., a user) the electronic device 901, a command or data to be used by another component (e.g., the processor 920) of the electronic device 901. The input module 950 may include, for example, a microphone, a mouse, a keyboard, a key (e.g., a button), or a digital pen (e.g., a stylus pen). The input module 950 may perform the operation of the inputter 106 of FIG. 1.

The sound output module 955 may output a sound signal to the outside of the electronic device 901. The sound output module 955 may include, for example, a speaker or a receiver. The speaker may be used for general purposes, such as playing multimedia or playing a recording. The receiver may be used to receive an incoming call. According to an embodiment of the disclosure, the receiver may be implemented separately from the speaker or as a part of the speaker.

The display module 960 may visually provide information to the outside (e.g., a user) of the electronic device 901. The display module 960 may include, for example, a control circuit for controlling a display, a hologram device, or a projector and control circuitry to control its corresponding one of the display, the hologram device, and the projector. According to an embodiment of the disclosure, the display module 960 may include a touch sensor adapted to detect a touch, or a pressure sensor adapted to measure the intensity of force of the touch. The display module 960 may perform the operation of the display 130 of FIG. 1.

The audio module 970 may convert sound into an electric signal or vice versa. According to an embodiment of the disclosure, the audio module 970 may obtain the sound via the input module 950 or output the sound via the sound output module 955 or an external electronic device (e.g., the external electronic device 902, such as a speaker or headphones) directly or wirelessly connected to the electronic device 901.

The sensor module 976 may detect an operational state (e.g., power or temperature) of the electronic device 901 or an environmental state (e.g., a state of a user) external to the electronic device 901 and generate an electric signal or data value corresponding to the detected state. According to an embodiment of the disclosure, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, a short-range detection sensor, a Lidar sensor, or illuminance sensor.

In addition, the sensor module 976 may further include a camera module capable of capturing still images and moving images. Here, the camera module may include one or more lenses, image sensors, ISPs, or flashes. The sensor module 976 may perform some operations of the inputter 106, some operations of the position detector 125, and the operation of the orientation detector 126 of FIG. 1.

The interface 977 may support one or more specified protocols to be used by the electronic device 901 to couple with the external electronic device (e.g., the external electronic device 902) directly (e.g., by wire) or wirelessly. According to an embodiment of the disclosure, the interface 977 may include, for example, a high-definition multimedia interface (HDMI), a universal serial bus (USB) interface, a secure digital (SD) card interface, or an audio interface.

For example, the electronic device 901 may transmit an image signal to an external electronic device through the connecting terminal 978. The electronic device 901 may transmit the image signal for the external electronic device to output an image to the display module 960 of the external electronic device.

The connecting terminal 978 may output an image signal or an audio signal. For example, the connecting terminal 978 may simultaneously output the image signal and the audio signal. For example, the electronic device 901 may output the image signal and the audio signal to the external electronic device through an interface, such as an HDMI, displayport (DP), or Thunderbolt, from the connecting terminal 978 that simultaneously outputs the image signal and the audio signal.

The connecting terminal 978 may include a connector through which the electronic device 901 may be physically connected to an external electronic device (e.g., the external electronic device 902). According to an embodiment of the disclosure, the connecting terminal 978 may include, for example, an HDMI connector, a DP connector, a Thunderbolt connector, a USB connector, an SD card connector, or an audio connector (e.g., a headphone connector).

The haptic module 979 may convert an electric signal into a mechanical stimulus (e.g., a vibration or a movement) or an electrical stimulus, which may be recognized by a user via their tactile sensation or kinesthetic sensation. According to an embodiment of the disclosure, the haptic module 979 may include, for example, a motor, a piezoelectric element, or an electric stimulator.

The power management module 988 may manage power supplied to the electronic device 901. According to an embodiment of the disclosure, the power management module 988 may be implemented as, for example, at least a part of a power management integrated circuit (PMIC).

The battery 989 may supply power to at least one component of the electronic device 901. According to an embodiment of the disclosure, the battery 989 may include, for example, a primary cell, which is not rechargeable, a secondary cell, which is rechargeable, or a fuel cell.

The communication module 990 may support establishing a direct (e.g., wired) communication channel or a wireless communication channel between the electronic device 901 and the external electronic device (e.g., the external electronic device 902, the external electronic device 904, or the server 908) and performing communication via the established communication channel. The communication module 990 may include one or more CPs that are operable independently from the processor 920 (e.g., an AP) and that support direct (e.g., wired) communication or wireless communication. According to an embodiment of the disclosure, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module, or a power line communication (PLC) module). A corresponding one of these communication modules may communicate with the external electronic device, for example, the external electronic device 904, via the first network 998 (e.g., a short-range communication network, such as Bluetooth™, Wi-Fi direct, or infrared data association (IrDA)) or the second network 999 (e.g., a long-range communication network, such as a legacy cellular network, a fifth-generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 992 may identify and authenticate the electronic device 901 in a communication network, such as the first network 998 or the second network 999, using subscriber information (e.g., international mobile subscriber identity (IMSI)) stored in the SIM 996. The communication module 990 may perform the operations of the communicator 102, the nearby apparatus detector 122, and the position detector 124 of FIG. 1.

The wireless communication module 992 may support a 5G network after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., a mmWave band) to achieve, e.g., a high data transmission rate. The wireless communication module 992 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 992 may support various requirements specified in the electronic device 901, an external electronic device (e.g., the external electronic device 904), or a network system (e.g., the second network 999). According to an embodiment of the disclosure, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment of the disclosure, the antenna module 997 may include an antenna including a radiating element including a conductive material or a conductive pattern formed in or on a substrate (e.g., a printed circuit board (PCB)). According to an embodiment of the disclosure, the antenna module 997 may include a plurality of antennas (e.g., an antenna array). In such a case, at least one antenna appropriate for a communication scheme used in a communication network, such as the first network 998 or the second network 999, may be selected by, for example, the communication module 990 from the plurality of antennas. The signal or power may be transmitted or received between the communication module 990 and the external electronic device via the at least one selected antenna. According to an embodiment of the disclosure, another component (e.g., a radio frequency integrated circuit (RFIC)) other than the radiating element may be additionally formed as a part of the antenna module 997.

According to various embodiments of the disclosure, the antenna module 997 may form a mmWave antenna module. According to an embodiment of the disclosure, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 901 and the external electronic device (e.g., the external electronic device 904) via the server 908 coupled with the second network 999. Each of the external electronic devices (e.g., the external electronic device 902 or 904) may be a device of the same type as or a different type from the electronic device 901. According to an embodiment of the disclosure, all or some of operations to be executed by the electronic device 901 may be executed by one or more external electronic devices (e.g., the external electronic devices 902 and 904 and the server 908). For example, if the electronic device 901 needs to perform a function or a service automatically, or in response to a request from a user or another device, the electronic device 901, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 901. The electronic device 901 may provide the result, with or without further processing the result, as at least part of a response to the request. To that end, cloud computing, distributed computing, mobile edge computing (MEC), or client-server computing technology may be used, for example. The electronic device 901 may provide ultra low-latency services using, e.g., distributed computing or MEC. In an embodiment of the disclosure, the external electronic device (e.g., the external electronic device 904) may include an Internet-of-things (IoT) device. The server

908 may be an intelligent server using machine learning and/or a neural network. According to an embodiment of the disclosure, the external electronic device (e.g., the external electronic device 904) or the server 908 may be included in the second network 999. The electronic device 901 may be applied to intelligent services (e.g., a smart home, a smart city, a smart car, or healthcare) based on 5G communication technology or IoT-related technology.

Figure 10:
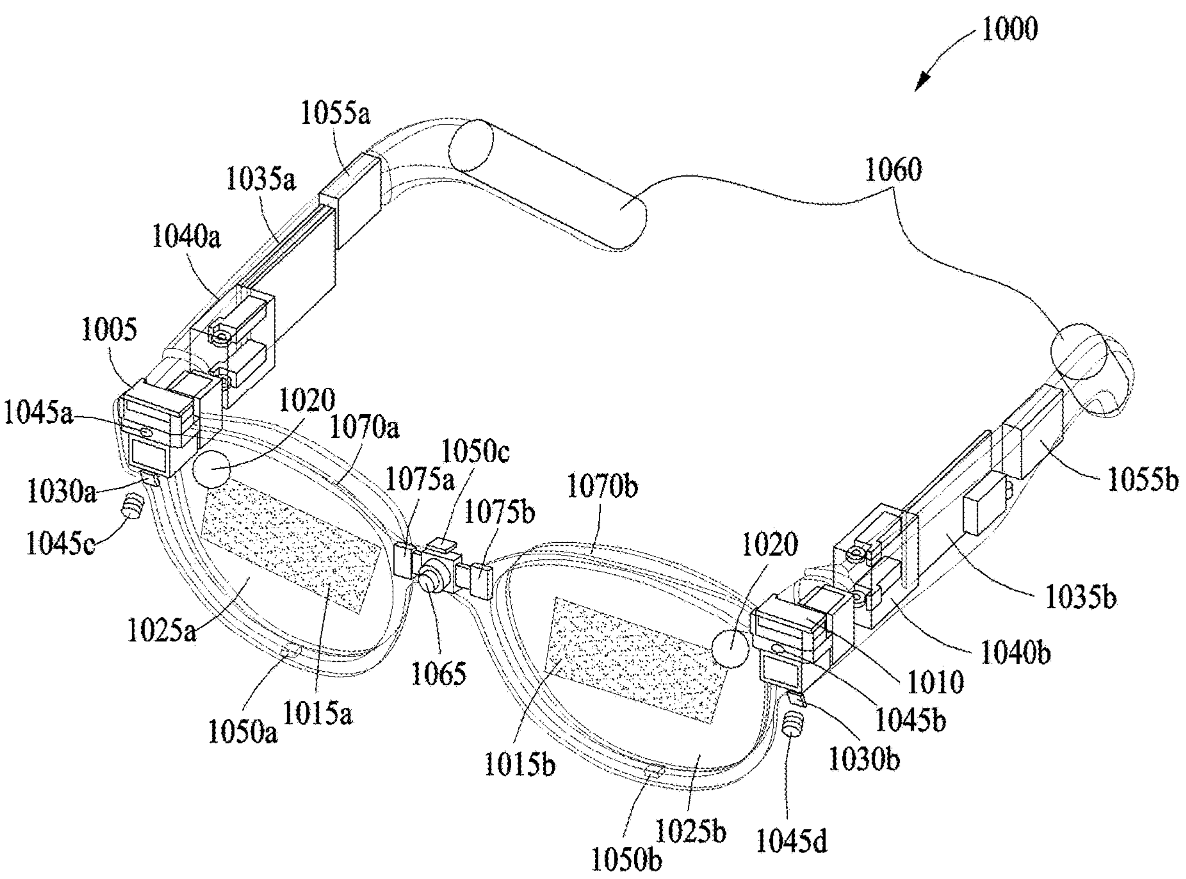
FIG. 10 is a diagram illustrating a structure of an electronic device implemented in a form of wearable augmented reality (AR) glasses according to an embodiment of the disclosure.

FIG. 10 is a diagram illustrating a structure of an electronic device implemented in a form of wearable AR glasses according to an embodiment of the disclosure.

Referring to FIG. 10, an electronic device 1000 may be worn on the face of a user and provide the user with an image related to an AR service and/or a virtual reality (VR) service.

The control device 100 may also be implemented as the electronic device 1000 in the form of an HMD.

In an embodiment of the disclosure, the electronic device 1000 may include a first display 1005, a second display 1010, a first screen display 1015*a*, a second screen display 1015*b*, an input optical member 1020, a first transparent member 1025*a*, a second transparent member 1025*b*, lighting portions 1030*a* and 1030*b*, a first PCB 1035*a*, a second PCB 1035*b*, a first hinge 1040*a*, a second hinge 1040*b*, first cameras 1045*a*, 1045*b*, 1045*c*, and 1045*d*, a plurality of microphones (e.g., a first microphone 1050*a*, a second microphone 1050*b*, and a third microphone 1050*c*), a plurality of speakers (e.g., a first speaker 1055*a* and a second speaker 1055*b*), a battery 1060, second cameras 1075*a* and 1075*b*, a third camera 1065, and visors 1070*a* and 1070*b*.

In an embodiment of the disclosure, displays (e.g., the first display 1005 and the second display 1010) may include, for example, a liquid crystal display (LCD) device, a digital mirror device (DMD), a liquid crystal on silicon (LCoS) device, an organic light-emitting diode (OLED), or a micro light-emitting diode (micro-LED). Although not shown in the drawings, when the displays include one of the LCD device, the DMD, or the LCoS device, the electronic device 1000 may include a light source that irradiates light onto screen output areas of the displays. In another embodiment of the disclosure, when the displays may generate light by themselves, for example, when the displays are made of one of the OLED or the micro-LED, the electronic device 1000 may provide a virtual image with good quality to the user even without including a separate light source. In an embodiment of the disclosure, when the displays are implemented with the OLED or the micro-LED, a light source is unnecessary, so the electronic device 1000 may be lightweight. Hereinafter, the displays that may generate light by themselves may be referred to as self-luminous displays, and the description is provided on the premise of the self-luminous displays.

According to various embodiments of the disclosure, the displays (e.g., the first display 1005 and the second display 1010) may be configured with at least one micro-LED. For example, the micro-LED may express red R, green G, and blue B by self-luminescence and may be small in size (e.g., 100 micrometers (μm) or less) so that one chip may implement one pixel (e.g., one of R, G, and B). Accordingly, when the displays are configured with the micro-LED, a high resolution may be provided without a backlight unit (BLU).

Embodiments are not limited thereto, one pixel may include R, G, and B, and one chip may be implemented with a plurality of pixels including R, G, and B.

In an embodiment of the disclosure, the displays (e.g., the first display 1005 and the second display 1010) may be configured with a display area including pixels to display a virtual image and light-receiving pixels (e.g., photo sensor pixels) disposed between the pixels, receiving light reflected from the eyes, converting the light into electrical energy, and outputting the electrical energy. The displays (e.g., the first display 1005 and the second display 1010) may perform the operation of the display 130 of FIG. 1.

In an embodiment of the disclosure, the electronic device 1000 may detect the gaze direction (e.g., a pupil movement) of the user through the light-receiving pixels. For example, the electronic device 1000 may detect and track the gaze direction of the user with respect to the right eye and the gaze direction of the user with respect to the left eye through one or more light-receiving pixels forming the first display 1005 and one or more light-receiving pixels forming the second display 1010. The electronic device 1000 may determine the position of the center of the virtual image according to the gaze direction of the user with respect to the right and left eyes (e.g., the direction in which the pupils of the right and left eyes of the user gaze) detected through one or more light-receiving pixels.

In an embodiment of the disclosure, light emitted from the displays (e.g., the first display 1005 and the second display 1010) may pass through a lens (not shown) and a waveguide and may reach the first screen display 1015*a* formed in the first transparent member 1025*a* disposed to face the right eye of the user and the second screen display 1015*b* formed in the second transparent member 1025*b* disposed to face the left eye of the user. For example, light emitted from the displays (e.g., the first display 1005 and the second display 1010) may pass through the waveguide, be reflected in a grating area formed in the input optical member 1020 and the screen displays 1015*a* and 1015*b*, and be transmitted to the eyes of the user. The first transparent member 1025*a* and/or the second transparent member 1025*b* may be formed of a glass plate, a plastic plate, or polymer and may be manufactured to be transparent or translucent.

In an embodiment of the disclosure, the lens (not shown) may be disposed on the front surfaces of the displays (e.g., the first display 1005 and the second display 1010). The lens (not shown) may include a concave lens and/or a convex lens. For example, the lens (not shown) may include a projection lens or a collimation lens.

In an embodiment of the disclosure, the screen displays 1015*a* and 1015*b* or the transparent members (e.g., the first transparent member 1025*a* and the second transparent member 1025*b*) may include a lens, which includes the waveguide, and a reflective lens.

In an embodiment of the disclosure, the waveguide may be made of glass, plastic, or polymer and may include nano-patterns formed in one surface inside or outside the waveguide, for example, a grating structure having a polygonal or curved shape. According to an embodiment of the disclosure, light that is incident on one end of the waveguide may be propagated inside the display waveguide by the nano-patterns and be provided to the user. In an embodiment of the disclosure, the waveguide configured with a free-form prism may provide the incident light to the user through a reflective mirror. The waveguide may include at least one diffractive element, for example, at least one of a diffractive optical element (DOE), a holographic optical element (HOE), or a reflective element (e.g., a reflective mirror). In an embodiment of the disclosure, the waveguide may induce light emitted from the first display 1005 and the second display 1010 to the eyes of the user using at least one diffractive element or reflective element included in the waveguide.

According to various embodiments of the disclosure, the diffractive element may include the input optical member 1020 and/or an output optical member (not shown). For example, the input optical member 1020 may refer to an input grating area, and the output optical member (not shown) may refer to an output grating area. The input grating area may serve as an input terminal, which diffracts (or reflects) light output from the displays (e.g., the first display 1005 and the second display 1010) (e.g., the micro-LED), to transmit the light to the transparent members (e.g., the first transparent member 1025*a* and the second transparent member 1025*b*) of the screen displays 1015*a* and 1015*b*. The output grating area may serve as an outlet that diffracts (or reflects) light transmitted to the transparent members (e.g., the first transparent member 1025*a* and the second transparent member 1025*b*) of the waveguide toward the eyes of the user.

According to various embodiments of the disclosure, the reflective element may include a total internal reflection (TIR) optical element or a TIR waveguide for TIR. For example, the TIR is a method of inducing light and may refer to a method of generating an angle of incidence such that light (e.g., a virtual image) input through the input grating area is 100% reflected from one surface (e.g., a certain surface) of the waveguide so that 100% of the light is transmitted to the output grating area.

In an embodiment of the disclosure, an optical path of light emitted from the first display 1005 and the second display 1010 may be induced to the waveguide through the input optical member 1020. Light traveling inside the waveguide may be induced toward the eyes of the user through the output optical member. The screen displays 1015*a* and 1015*b* may be determined based on the light emitted toward the eyes.

In an embodiment of the disclosure, the first cameras 1045*a*, 1045*b*, 1045*c*, and 1045*d* may include a camera used for 9 degrees of freedom (3DoF), 6 DoF head-tracking, hand detection and tracking, and gesture and/or spatial recognition. For example, the first cameras 1045*a*, 1045*b*, 1045*c*, and 1045*d* may include a global shutter (GS) camera to detect and track the movement of the head and hand.

For example, a stereo camera may be applied to the first cameras 1045*a*, 1045*b*, 1045*c*, and 1045*d* for head-tracking and spatial recognition, and cameras with the same standard and performance may be applied. A GS camera with excellent performance (e.g., image dragging) may be used for the first cameras 1045*a*, 1045*b*, 1045*c*, and 1045*d* to detect and track fine movements, such as rapid hand movement and finger movement.

According to various embodiments of the disclosure, a rolling shutter (RS) camera may be used for the first cameras 1045*a*, 1045*b*, 1045*c*, and 1045*d*. The first cameras 1045*a*, 1045*b*, 1045*c*, and 1045*d* may perform spatial recognition for 6 DoF and a simultaneous localization and mapping (SLAM) function through depth capturing. The first cameras 1045*a*, 1045*b*, 1045*c*, and 1045*d* may perform a user gesture recognition function.

In an embodiment of the disclosure, the second cameras 1075*a* and 1075*b* may be used for the purpose of detecting and tracking the pupils. The second cameras 1075*a* and 1075*b* may be referred to as eye-tracking (ET) cameras. The second cameras 1075*a* and 1075*b* may track the gaze direction of the user. The electronic device 1000 may consider the gaze direction of the user and position of the center of a virtual image projected on the screen displays 1015*a* and 1015*b* according to the direction in which the pupils of the user gaze.

A GS camera may be used for the second cameras 1075*a* and 1075*b* to track the gaze direction so that the pupils are detected and the rapid pupil movement is tracked. The second camera 1075*a* may be installed for each of the left eye and the right eye, and cameras with the same performance and standard may be used for the second camera 1075*a* for the left eye and the right eye.

In an embodiment of the disclosure, the third camera 1065 may be referred to as a high resolution (HR) or a photo video (PV) and may include an HR camera. The third camera 1065 may include a color camera equipped with functions, such as an auto focus (AF) function and an optical image stabilizer (OIS), to obtain a high-quality image. The third camera 1065 is not limited thereto and may include a GS camera or an RS camera.

The first cameras 1045*a*, 1045*b*, 1045*c*, and 1045*d*, the second cameras 1075*a* and 1075*b*, and the third camera 1065 may perform some operations of the inputter 106 of FIG. 1.

In an embodiment of the disclosure, at least one sensor (e.g., a gyro sensor, an acceleration sensor, a magnetometer sensor, a touch sensor, an illuminance sensor, and/or a gesture sensor) and the first cameras 1045*a*, 1045*b*, 1045*c*, and 1045*d* may perform, for 6 DoF, at least one of head-tracking, pose estimation and prediction, gesture and/or spatial recognition, and a SLAM function through depth capturing. At least one sensor may perform some operations of the inputter 106, the position detector 124, and the orientation detector 126 of FIG. 1.

In an embodiment of the disclosure, the first cameras 1045*a*, 1045*b*, 1045*c*, and 1045*d* may be used separately as a camera for head-tracking and a camera for hand-tracking.

In an embodiment of the disclosure, the lighting portions 1030*a* and 1030*b* may have different uses depending on the attachment position. For example, the lighting portions 1030*a* and 1030*b* may be attached together with the first cameras 1045*a*, 1045*b*, 1045*c*, and 1045*d* mounted around the hinges (e.g., the first hinge 1040*a* and the second hinge 1040*b*), which connect a frame to a temple, or around a bridge connecting the frames. When capturing with a GS camera, the lighting portions 1030*a* and 1030*b* may be used as a means of supplementing the surrounding brightness. For example, when it is difficult to detect a subject to be captured due to a dark environment, mixing of various light sources, and reflected light, the lighting portions 1030*a* and 1030*b* may be used.

In an embodiment of the disclosure, PCBs (e.g., the first PCB 1035*a* and the second PCB 1035*b*) may include a processor (not shown), memory (not shown), and a communication module (not shown) that control components of the electronic device 1000. In addition, the PCBs (e.g., the first PCB 1035*a* and the second PCB 1035*b*) may include the controller 110 of FIG. 1.

The communication module may perform the operation of the communicator 102, the operation of the nearby apparatus detector 122, and some operations of the position detector 124 of FIG. 1 (e.g., in the case of position detection using UWB communication). For example, the communication module may support establishing a direct (e.g., wired) communication channel or a wireless communication channel between the electronic device 1000 and an external electronic device and performing communication through the established communication channel. The PCB may transmit electrical signals to the components constituting the electronic device 1000.

The communication module (not shown) may include one or more communication processors that are operable independently from the processor and support direct (e.g., wired)

communication or wireless communication. According to an embodiment of the disclosure, the communication module (not shown) may include a wireless communication module (e.g., a cellular communication module, a short-range wireless communication module, or a GNSS communication module) or a wired communication module (e.g., a LAN communication module, or a PLC module). A corresponding one (not shown) of these communication modules may communicate with the external electronic device via a short-range communication network (e.g., Bluetooth™, Wi-Fi direct, or IrDA) or a long-range communication network (e.g., a legacy cellular network, a 5G network, a next-generation communication network, the Internet, or a computer network (e.g., a LAN or a WAN)). These various types of communication modules may be implemented as a single component (e.g., a single chip) or may be implemented as multi components (e.g., multiple chips) separate from each other.

The wireless communication module may support a 5G network after a 4G network and next-generation communication technology, e.g., NR access technology. The NR access technology may support enhanced mobile broadband (eMBB), massive machine type communications (mMTC), or ultra-reliable and low-latency communications (URLLC)). The wireless communication module may support a high-frequency band (e.g., a mmWave band) to achieve, e.g., a high data transmission rate. The wireless communication module may support various technologies for securing performance on a high-frequency band, such as, e.g., beam-forming, massive MIMO, FD-MIMO, an array antenna, analog beam-forming, or a large-scale antenna.

The electronic device 1000 may further include an antenna module (not shown). The antenna module may transmit or receive a signal or power to or from the outside (e.g., the external electronic device). According to an embodiment of the disclosure, the antenna module may include an antenna including a radiating element including a conductive material or a conductive pattern formed in or on substrates (e.g., the first PCB 1035*a* and the second PCB 1035*b*). According to an embodiment of the disclosure, the antenna module may include a plurality of antennas (e.g., array antennas).

In an embodiment of the disclosure, a plurality of microphones (e.g., the first microphone 1050*a*, the second microphone 1050*b*, and the third microphone 1050*c*) may process an external acoustic signal into electrical audio data. The processed audio data may be variously utilized according to a function (or an application being executed) being performed by the electronic device 1000.

In an embodiment of the disclosure, a plurality of speakers (e.g., the first speaker 1055*a* and the second speaker 1055*b*) may output audio data received from the communication module or stored in the memory.

In an embodiment of the disclosure, one or more batteries 1060 may be included and may supply power to components constituting the electronic device 1000.

In an embodiment of the disclosure, the visors 1070*a* and 1070*b* may adjust a transmittance amount of external light that is incident on the eyes of the user according to the transmittance. The visors 1070*a* and 1070*b* may be disposed in front of or behind the screen displays 1015*a* and 1015*b*. The front side of the screen displays 1015*a* and 1015*b* may refer to a direction that is opposite to the user wearing the electronic device 1000, and the rear side may refer to a direction of the user wearing the electronic device 1000. The visors 1070*a* and 1070*b* may protect the screen displays 1015*a* and 1015*b* and adjust the transmittance amount of external light.

For example, the visors 1070*a* and 1070*b* may include an electrochromic element that changes color according to applied power to adjust the transmittance. Electrochromism is a phenomenon in which colors change due to an oxidation-reduction reaction caused by applied power. The visors 1070*a* and 1070*b* may adjust the transmittance of external light using the change in colors in the electrochromic element.

For example, the visors 1070*a* and 1070*b* may include a control module and the electrochromic element. The control module may control the electrochromic element to adjust the transmittance of the electrochromic element.

According to an embodiment of the disclosure, a method of controlling a nearby apparatus by a control device may include connecting communication with a control target apparatus 150, selecting an interaction mode corresponding to the control target apparatus 150, receiving input information, and when an execution command corresponding to the input information exists in an operation database according to the interaction mode, transmitting the execution command corresponding to the input information to the control target apparatus 150.

According to an embodiment of the disclosure, the method may further include verifying whether the interaction mode is capable of being changed when an execution command corresponding to the input information does not exist in an operation database according to the interaction mode, changing the interaction mode when it is possible to change the interaction mode, and when an execution command corresponding to the input information exists in the operation database according to the interaction mode, executing the execution command corresponding to the input information.

According to an embodiment of the disclosure, the method may further include outputting related notification information when it is impossible to change the interaction mode.

According to an embodiment of the disclosure, the method may further include outputting a result of executing the execution command corresponding to the input information through the control target apparatus 150 or the control device 100.

According to an embodiment of the disclosure, in the method, the outputting of the result of executing the execution command corresponding to the input information through the control target apparatus or the control device 100 may include receiving the result of executing the execution command from the control target apparatus 150 and outputting the result of executing.

According to an embodiment of the disclosure, in the method, the input information may include at least one of pupil-tracking input information, hand-tracking input information, head-tracking input information, voice input information, an operation status of the control target apparatus 150, and characteristic information of the control target apparatus 150.

According to an embodiment of the disclosure, in the method, the operation status of the control target apparatus 150 may include at least one of application information being executed by the control target apparatus 150, which is received from the control target apparatus 150, application information executable by the control target apparatus 150, which is received from the control target apparatus 150, and application information executable by the control target apparatus 150 and interoperable with the control device 100, which is received from the control target apparatus 150.

According to an embodiment of the disclosure, in the method, the characteristic information of the control target apparatus 150 may include at least one of state information of the control target apparatus 150, which is received from the control target apparatus 150, setting information of the control target apparatus 150, which is received from the control target apparatus 150, and sensing information measured by the control target apparatus 150, which is received from the control target apparatus 150.

According to an embodiment of the disclosure, in the method, the selecting of the interaction mode corresponding to the control target apparatus 150 may include selecting one of a mobile mode, an Internet of things (IoT) mode, or a display mode according to the control target apparatus 150.

According to an embodiment of the disclosure, in the method, the selecting of the interaction mode corresponding to the control target apparatus may include selecting a mode with a higher priority by assigning priorities in order of a mobile mode, an IoT mode, and a display mode when the control target apparatus is provided in plurality and the plurality of control target apparatuses has different interaction modes.

According to an embodiment of the disclosure, the method may further include searching for a nearby apparatus, obtaining information of an unconnected nearby apparatus, estimating the distance and the direction with respect to the nearby apparatus, and selecting the control target apparatus by considering the distance to the nearby apparatus and the direction of the nearby apparatus.

According to an embodiment of the disclosure, in the method, the selecting of the control target apparatus by considering the distance to the nearby apparatus and the direction of the nearby apparatus may include selecting the nearby apparatus as the control target apparatus when the distance to the nearby apparatus is in a preset effective distance corresponding to the nearby apparatus and the direction of the nearby apparatus is in a preset angle range of the control device.

According to an embodiment of the disclosure, in the method, the estimating of the distance and the direction with respect to the nearby apparatus may include estimating the distance and the direction with respect to the nearby apparatus using at least one of a short-range detection sensor, an image sensor, a light detection and ranging (Lidar) sensor, and ultra-wideband (UWB) communication.

According to an embodiment of the disclosure, the method may further include displaying the control target apparatus before receiving the input information.

According to an embodiment of the disclosure, a control device for controlling a nearby apparatus may include a communicator 102 configured to connect communication with a control target apparatus 150, an inputter 106 configured to receive input information, memory 104 configured to store an operation database, a controller 110 configured to select an interaction mode corresponding to the control target apparatus 150, and when an execution command corresponding to the input information exists in the operation database according to the interaction mode, configured to control the execution command corresponding to the input information to be transmitted to the control target apparatus 150.

According to an embodiment of the disclosure, in the control device, the controller 110 may be configured to, when an execution command corresponding to the input information does not exist in the operation database according to the interaction mode, verify whether the interaction mode is capable of being changed, change the interaction mode when it is possible to change the interaction mode, and when an execution command corresponding to the input information exists in the operation database according to the interaction mode, control the execution command corresponding to the input information to be executed by the control target apparatus 150.

According to an embodiment of the disclosure, in the control device, the controller 110 may be configured to control the result of executing the execution command corresponding to the input information to be output through the control target apparatus or the control device.

According to an embodiment of the disclosure, in the control device, the controller 110 may be configured to select one of a mobile mode, an IoT mode, or a display mode according to the control target apparatus when selecting the interaction mode.

According to an embodiment of the disclosure, the control device may further include a nearby apparatus detector 122 configured to search for a nearby apparatus, a position detector 124 configured to estimate the distance and the direction with respect to the nearby apparatus, and an orientation detector 126 configured to verify the orientation of the control device.

The controller 110 may be configured to search for a nearby apparatus through the nearby apparatus detector 122, obtain information of an unconnected nearby apparatus, estimate the distance and the direction with respect to the nearby apparatus through the position detector 124, and select the control target apparatus by considering the distance to the nearby apparatus and the direction of the nearby apparatus.

According to an embodiment of the disclosure, in the control device, the controller 110 may be configured to select the nearby apparatus as the control target apparatus when the distance to the nearby apparatus is in a preset effective distance corresponding to the nearby apparatus and the direction of the nearby apparatus is in a preset angle range of the control device.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments of the disclosure, or they may be of the kind well-known and available to those having skill in the computer software arts. Examples of non-transitory computer-readable media include magnetic media, such as hard disks, floppy disks, and magnetic tape, optical media, such as CD-ROM discs and/or DVDs, magneto-optical media, such as optical discs, and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The devices described above may be configured to act as one or more software modules in order to perform the operations of the embodiments of the disclosure, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer readable recording mediums.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling a nearby apparatus by a control device, the method comprising:

connecting, by the control device, communication with a control target apparatus;

selecting an interaction mode corresponding to the control target apparatus, wherein the interaction mode corresponds to a type of the control target apparatus;

receiving, by the control device, input information;

when an execution command corresponding to the input information exists in an operation database according to the interaction mode, transmitting, by the control device, the execution command corresponding to the input information to the control target apparatus; and verifying whether the interaction mode is capable of being changed when an execution command corresponding to the input information does not exist in an operation database according to the interaction mode.

2. The method of claim 1, further comprising:

changing the interaction mode when it is possible to change the interaction mode, and when an execution command corresponding to the input information exists in the operation database according to the interaction mode, executing the execution command corresponding to the input information; and outputting related notification information when it is impossible to change the interaction mode.

3. The method of claim 2, wherein the selecting of the interaction mode corresponding to the control target apparatus comprises selecting one of:

a mobile mode, an Internet of things (IoT) mode, or a display mode according to the control target apparatus.

4. The method of claim 3, wherein the selecting of the interaction mode corresponding to the control target apparatus comprises selecting a mode with a higher priority by assigning priorities in order of a mobile mode, an IoT mode, and a display mode when the control target apparatus is provided in plurality and a plurality of control target apparatuses has different interaction modes.

5. The method of claim 1, further comprising:

outputting a result of executing the execution command corresponding to the input information through the control target apparatus or the control device.

6. The method of claim 5, wherein the outputting of the result of executing the execution command corresponding to the input information through the control target apparatus or the control device comprises:

receiving the result of executing the execution command from the control target apparatus; and outputting the result of executing.

7. The method of claim 1, wherein the input information comprises at least one of:

pupil-tracking input information;

hand-tracking input information;

head-tracking input information;

voice input information;

an operation status of the control target apparatus; or characteristic information of the control target apparatus.

8. The method of claim 7, wherein the operation status of the control target apparatus comprises at least one of:

application information being executed by the control target apparatus, which is received from the control target apparatus;

application information executable by the control target apparatus, which is received from the control target apparatus; or application information executable by the control target apparatus and interoperable with the control device, which is received from the control target apparatus.

9. The method of claim 8, wherein the characteristic information of the control target apparatus comprises at least one of:

state information of the control target apparatus, which is received from the control target apparatus;

setting information of the control target apparatus, which is received from the control target apparatus; or sensing information measured by the control target apparatus, which is received from the control target apparatus.

10. The method of claim 1, further comprising:

searching for a nearby apparatus;

obtaining information of an unconnected nearby apparatus;

estimating a distance and a direction with respect to the nearby apparatus; or selecting the control target apparatus by considering the distance to the nearby apparatus and the direction of the nearby apparatus.

11. The method of claim 10, wherein the selecting of the control target apparatus by considering the distance to the nearby apparatus and the direction of the nearby apparatus comprises selecting the nearby apparatus as the control target apparatus when the distance to the nearby apparatus is in a preset effective distance corresponding to the nearby apparatus and the direction of the nearby apparatus is in a preset angle range of the control device.

12. The method of claim 11, wherein the estimating of the distance and the direction with respect to the nearby apparatus comprises estimating the distance and the direction with respect to the nearby apparatus using at least one of a short-range detection sensor, an image sensor, a light detection and ranging (Lidar) sensor, or ultra-wideband (UWB) communication.

13. One or more non-transitory computer-readable storage media storing one or more programs including computer executable instructions that, when executed by one or more processors of a control device individually or collectively, cause the control device to perform operations, the operations comprising:

connecting, by the control device, communication with a control target apparatus;

selecting an interaction mode corresponding to the control target apparatus, wherein the interaction mode corresponds to a type of the control target apparatus;

receiving, by the control device, input information;

when an execution command corresponding to the input information exists in an operation database according to the interaction mode, transmitting, by the control device, the execution command corresponding to the input information to the control target apparatus; and verifying whether the interaction mode is capable of being changed when an execution command corresponding to the input information does not exist in an operation database according to the interaction mode.

14. A control device for controlling a nearby apparatus, the control device comprising:

a communicator configured to connect communication with a control target apparatus;

an inputter configured to receive input information; and memory storing one or more computer programs, wherein the one or more computer programs include computer-executable instructions that, when executed by one or more processors individually or collectively, cause the control device to:

select an interaction mode corresponding to the control target apparatus, wherein the interaction mode corresponds to a type of the control target apparatus, receive the input information, when an execution command corresponding to the input information exists in an operation database according to the interaction mode, control the execution command corresponding to the input information to be transmitted to the control target apparatus, and verify whether the interaction mode is capable of being changed when an execution command corresponding to the input information does not exist in an operation database according to the interaction mode.

15. The control device of claim 14, wherein the one or more computer programs further include computer-executable instructions that, when executed by the one or more processors individually or collectively, cause the control device to:

change the interaction mode when it is possible to change the interaction mode, and when an execution command corresponding to the input information exists in the operation database according to the interaction mode, executing the execution command corresponding to the input information, and output related notification information when it is impossible to change the interaction mode.

16. The control device of claim 14, wherein the one or more computer programs further include computer-executable instructions that, when executed by the one or more processors individually or collectively, cause the control device to:

output a result of executing the execution command corresponding to the input information through the control target apparatus or the control device.

17. The control device of claim 16, wherein the one or more computer programs further include computer-executable instructions that, when executed by the one or more processors individually or collectively, cause the control device to:

receive the result of executing the execution command from the control target apparatus, and output the result of executing.

* * * * *